United States Patent
Ezykowsky

(10) Patent No.: US 11,242,911 B1
(45) Date of Patent: Feb. 8, 2022

(54) ROPE TENSIONING DEVICE

(71) Applicant: Eric Ezykowsky, Altoona, PA (US)

(72) Inventor: Eric Ezykowsky, Altoona, PA (US)

( * ) Notice: Subject to any disclaimer, the term of this patent is extended or adjusted under 35 U.S.C. 154(b) by 0 days.

(21) Appl. No.: 17/024,220

(22) Filed: Sep. 17, 2020

(51) Int. Cl.
*F16G 11/04* (2006.01)
*F16G 11/14* (2006.01)

(52) U.S. Cl.
CPC .......... *F16G 11/046* (2013.01); *F16G 11/14* (2013.01)

(58) Field of Classification Search
CPC ......... F16B 45/02; F16G 11/046; F16G 15/00
See application file for complete search history.

(56) References Cited

U.S. PATENT DOCUMENTS

| | | | | |
|---|---|---|---|---|
| 2,441,336 A * | 5/1948 | Sova | ...................... | B60D 1/187 24/129 R |
| 3,678,543 A * | 7/1972 | Hobbs | ...................... | A62B 1/04 182/191 |
| 4,214,350 A | 7/1980 | Copelan | | |
| 4,723,634 A * | 2/1988 | Fisk | ...................... | A62B 1/04 182/5 |
| 4,910,834 A * | 3/1990 | Minkler | ................. | B60P 7/0823 24/129 A |
| 4,939,820 A * | 7/1990 | Babcock | ............... | F16G 11/046 24/129 B |
| 5,217,092 A * | 6/1993 | Potter | ...................... | A62B 1/04 188/65.1 |
| 6,095,282 A * | 8/2000 | Sadeck | ...................... | A62B 1/04 182/191 |
| 7,908,716 B2 | 3/2011 | Sorensen | | |
| 8,661,624 B1 | 3/2014 | Bracewell | | |
| 8,864,797 B2 * | 10/2014 | Justin | .................... | A61F 2/0811 606/232 |
| 9,636,526 B2 | 5/2017 | Galyan | | |
| 10,197,132 B2 | 2/2019 | Pfahnl | | |
| 2016/0213953 A1 * | 7/2016 | Galyan | ...................... | A62B 1/14 |

* cited by examiner

*Primary Examiner* — David M Upchurch

(57) ABSTRACT

A rope tensioning device for removing slack in a rope includes a plate, which has a hole positioned therethrough. A tongue engaged to and extending from the plate is can be inserted into a loop of a rope inserted through the hole so that the rope is slidably engaged to the plate. The rope has a first end secured to an object, positioning a user to extend a second end of the rope through or around an anchoring element. An L-shaped protrusion engaged to and extending from the plate defines a groove. The rope extending back from the anchoring element can be inserted into the groove. The user is positioned to knot the rope so that the rope is engaged to the plate. The plate then can be slid along the rope toward the object to tension the rope.

8 Claims, 5 Drawing Sheets

US 11,242,911 B1

ROPE TENSIONING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tensioning devices and more particularly pertains to a new tensioning device for removing slack in a rope.

(2) Description of Related Art Including Information Disclosed Under 37 CFR 1.97 and 1.98

The prior art relates to tensioning devices and may comprise cleats, plates having cutouts extending thereinto and therethrough, and the like.

BRIEF SUMMARY OF THE INVENTION

An embodiment of the disclosure meets the needs presented above by generally comprising a plate, which has a hole positioned therethrough. A tongue is engaged to and extends from a lower edge of the plate. The tongue is configured to be inserted into a loop of a rope inserted through the hole so that the rope is slidably engaged to the plate. The rope has a first end secured to an object, for example a tent post, positioning a user to extend a second end of the rope through or around an anchoring element, such as a tent stake.

A protrusion is engaged to and extends from a rear edge of the plate proximate to the lower edge. The protrusion is substantially L-shaped when viewed from a respective opposed side of the plate so that the protrusion and the rear edge of the plate define a groove. The groove is configured for insertion of the rope extending back from the anchoring element. The user is positioned to knot the rope so that the rope is engaged to the plate. The plate is configured to be slid along the rope toward the object to tension the rope.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
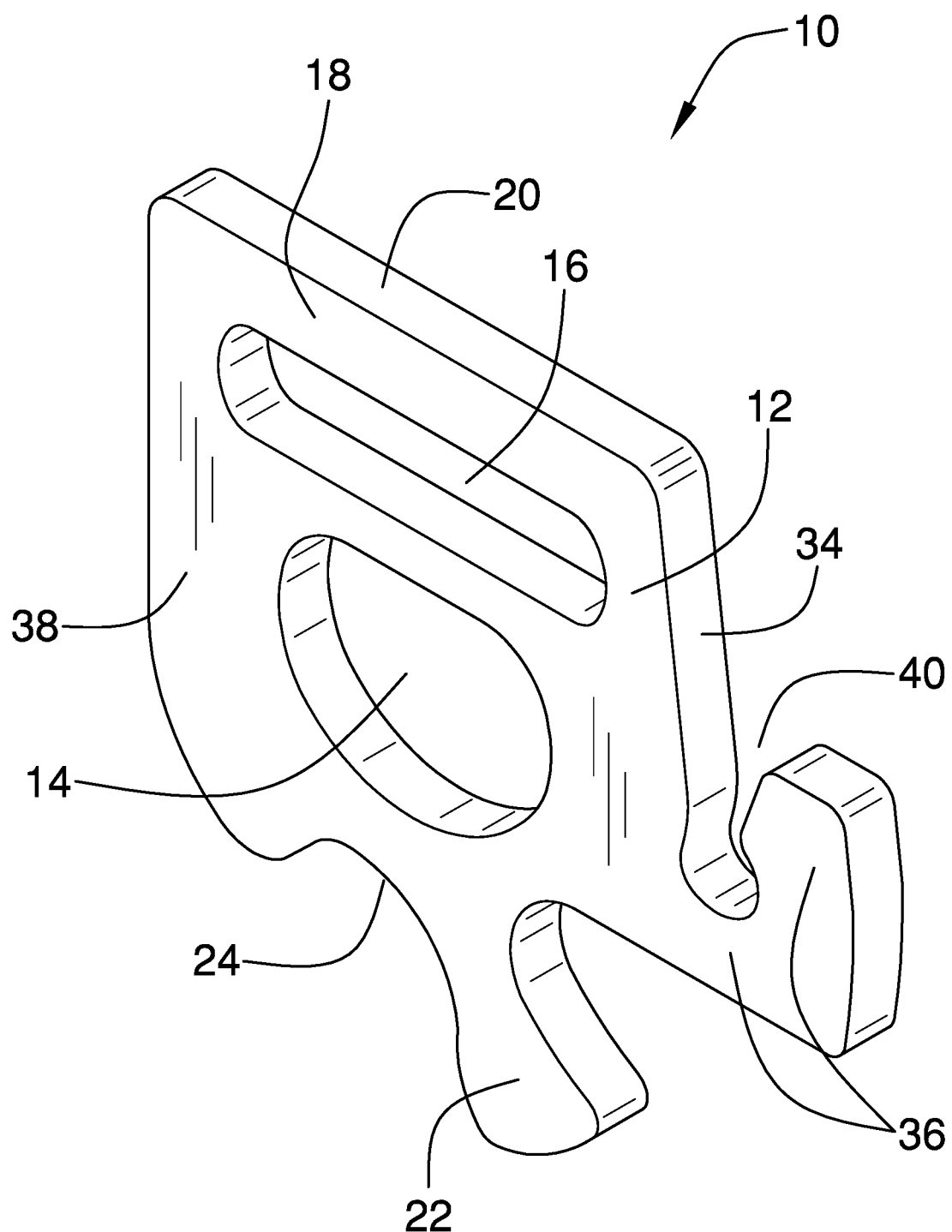
FIG. 1 is an isometric perspective view of a rope tensioning device according to an embodiment of the disclosure.
Figure 2:
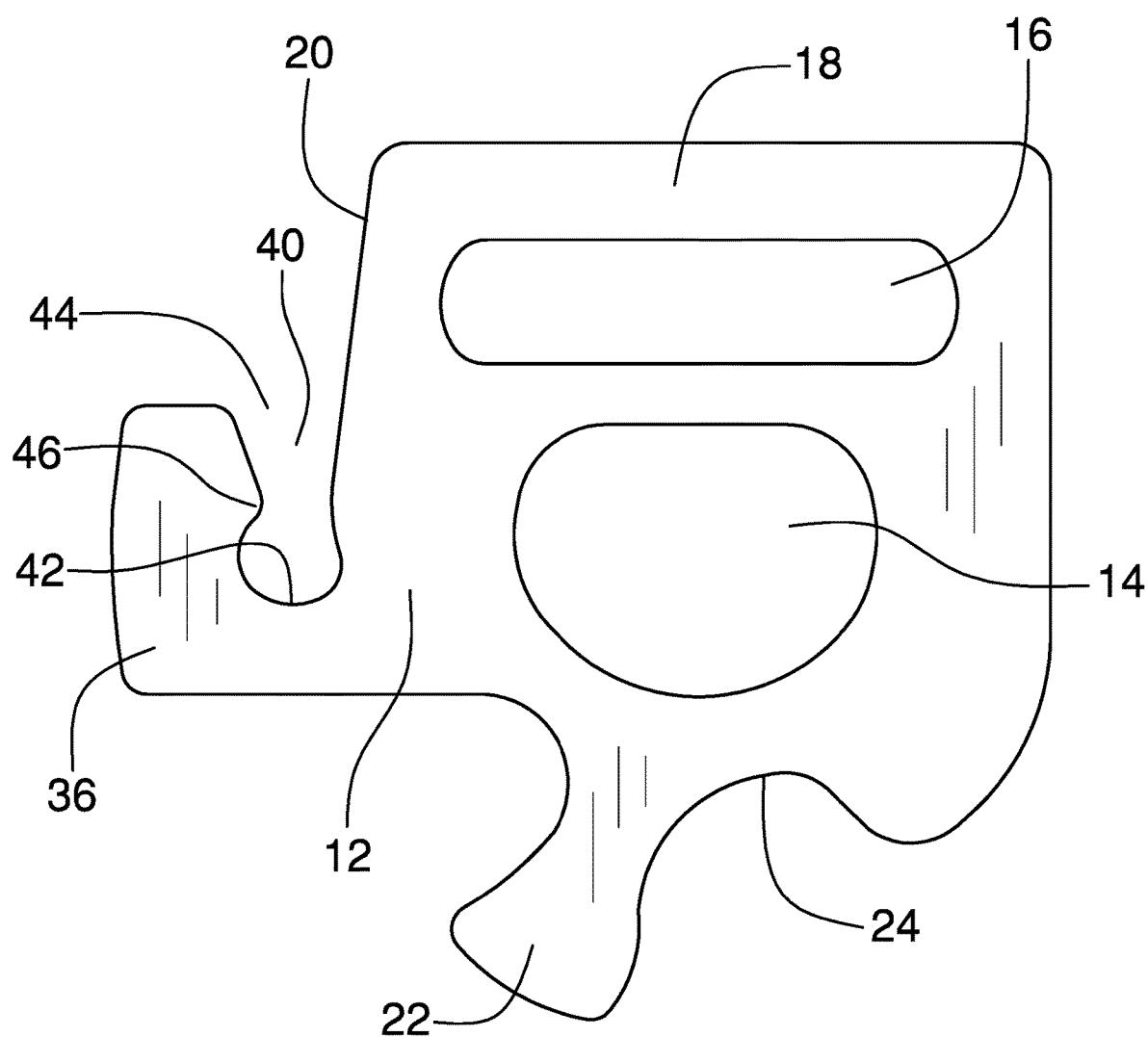
FIG. 2 is a side view of an embodiment of the disclosure.

With reference now to the drawings, and in particular to FIGS. 1 through 5 thereof, a new tensioning device embodying the principles and concepts of an embodiment of the disclosure and generally designated by the reference numeral 10 will be described.

As best illustrated in FIGS. 1 through 5, the rope tensioning device 10 generally comprises a plate 12, which has a hole 14 positioned therethrough. The plate 12 may comprise aluminum, or other substantially rigid material, such as, but not limited to, steel, titanium, wood, plastic, and the like.

The plate 12 has a slot 16 positioned therethrough to define a handle 18. The slot 16 is configured for insertion of digits of a hand of a user, enabling the user to grasp the handle 18. The slot 16 is positioned between the hole 14 and an upper edge 20 of the plate 12. The present invention also anticipates the handle 18 being removably engaged to the plate 12.

Figure 3:
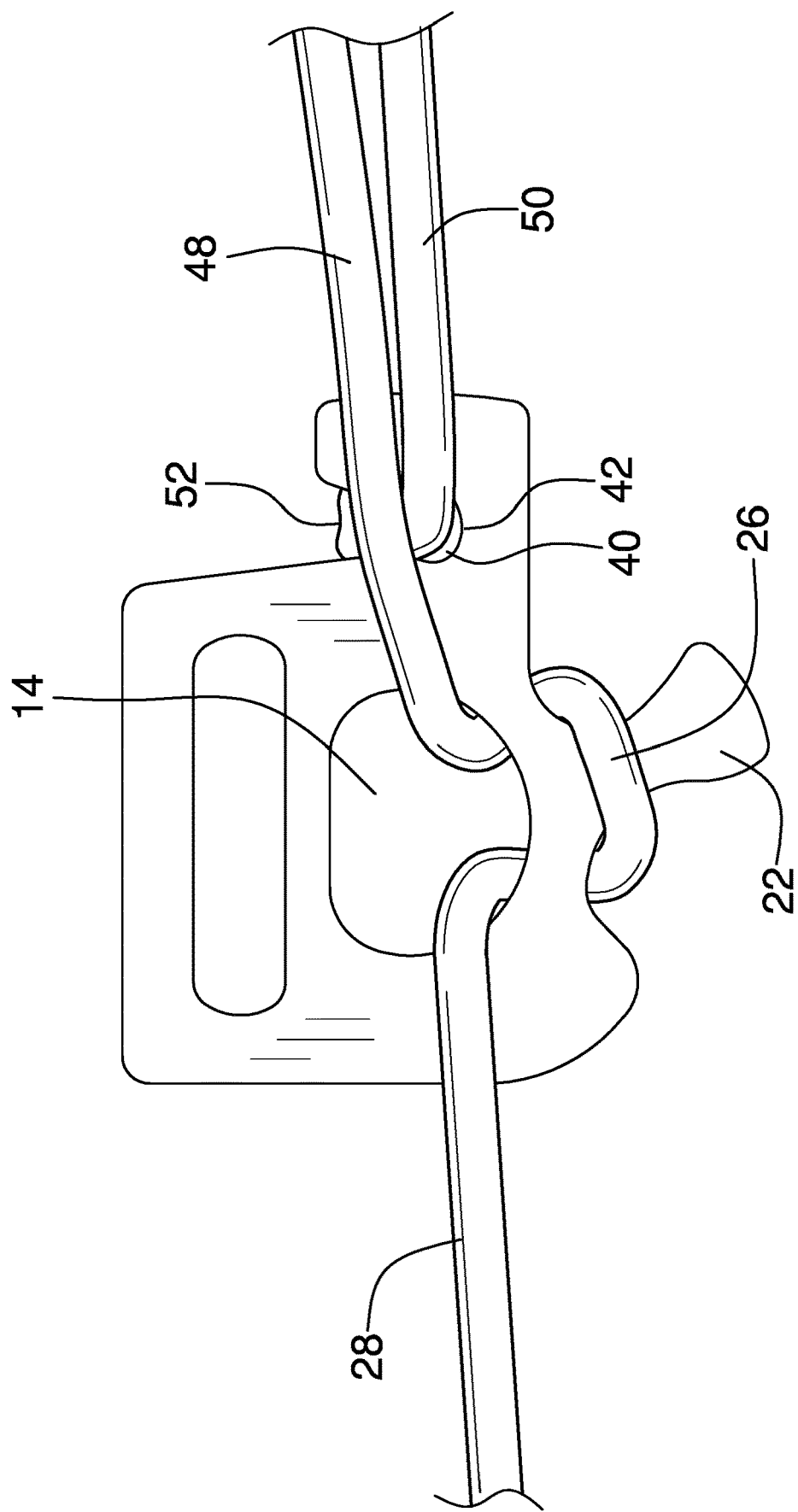
FIG. 3 is an in-use view of an embodiment of the disclosure.
Figure 5:
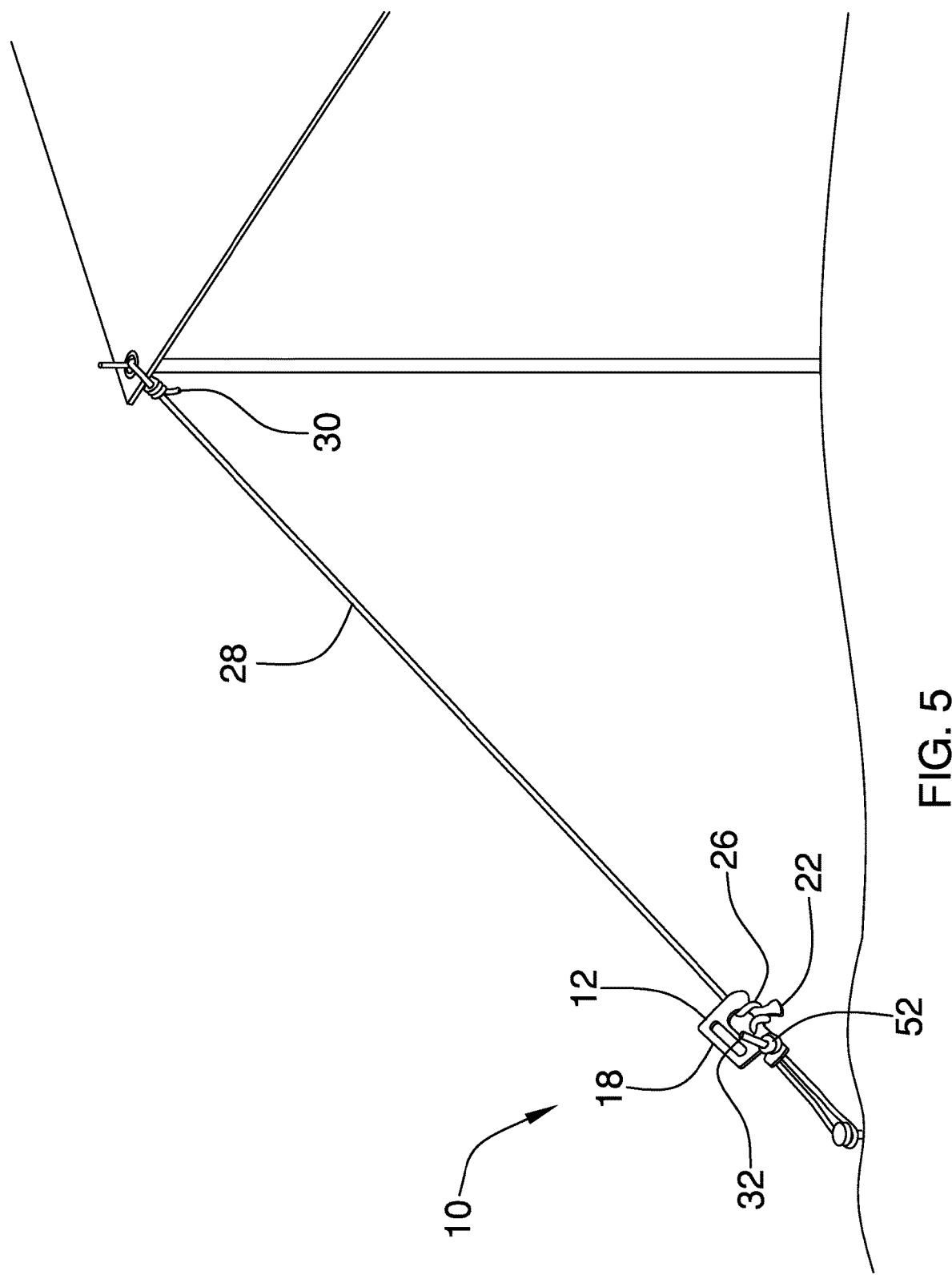
FIG. 5 is an in-use view of an embodiment of the disclosure.

A tongue 22 is engaged to and extends from a lower edge 24 of the plate 12. The tongue 22 is configured to be inserted into a loop 26 of a rope 28 inserted through the hole 14 so that the rope 28 is slidably engaged to the plate 12. The rope 28 has a first end 30 secured to an object, for example a tent post, as shown in FIG. 5. The user is positioned to extend a second end 32 of the rope 28 through or around an anchoring element, such as a tent stake. The tongue 22 extends transversely from the lower edge 24 toward a rear edge 34 of the plate 12, as shown in FIG. 3. The tongue 22 is circumferentially larger distal from the plate 12 so that the tongue 22 is configured to frictionally engage the rope 28 to deter slippage of the rope 28 off of the tongue 22.

Figure 4:
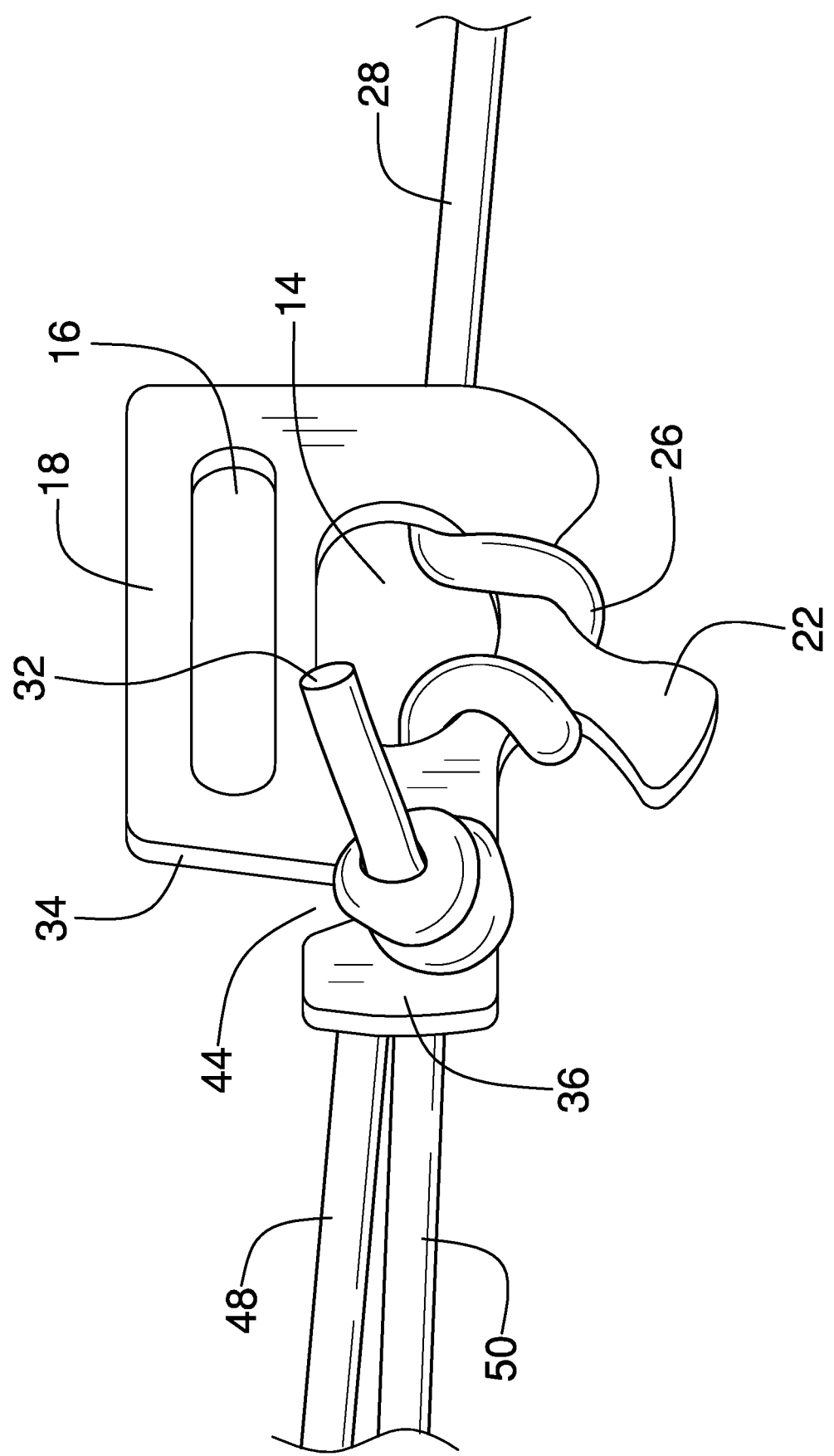
FIG. 4 is an in-use view of an embodiment of the disclosure.

A protrusion 36 is engaged to and extends from the rear edge 34 of the plate 12 proximate to the lower edge 24. The protrusion 36 is substantially L-shaped when viewed from a respective opposed side 38 of the plate 12 so that the protrusion 36 and the rear edge 34 of the plate 12 define a groove 40. The groove 40 is configured for insertion of the rope 28 as it is extended back from the anchoring element. The user is positioned to knot the rope 28 so that the rope 28 is engaged to the plate 12, as shown in FIG. 4. The plate 12 is configured to be slid along the rope 28 toward the object to tension the rope 28.

The groove 40 is arcuate proximate a lower limit 42 thereof and thus complementary to a cross-sectional profile of the rope 28. The groove 40 is tapered proximate to an upper limit 44 thereof, such that the groove 40 is dimensionally wider proximate to the upper limit 44 relative to a midpoint 46 thereof. The groove 40 being wider proximate to the upper limit 44 facilitates insertion of the rope 28 into the slot 16.

In use, the first end 30 of the rope 28 is secured to the object. The user then forms the loop 26 in the rope 28 and inserts the loop 26 through the hole 14 and around the tongue 22, as shown in FIGS. 3 and 4. The rope 28 then is extended through or around the anchoring element and back to the plate 12. The rope 28 is positioned into the groove 40 so that second end 32 of the rope 28 and the loop 26 are on the same opposed side 38 of the plate 12, as shown in FIG. 4. A segment 48 of the rope 28 extending from the rear edge 34 of the plate 12 is positioned atop a portion 50 of the rope 28 adjacent to the second end 32. The user then forms a knot 52 in the rope 28 on the same opposed side 38 of the plate 12 as is the loop 26. The user then can tension the rope 28 by grasping the handle 18 and motivating the plate 12 toward the object. When slack in the rope 28 is required, the handle 18 can be grasped and the plate 12 motivated toward the anchoring element.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A rope tensioning device comprising:
    a plate having a hole positioned therethrough, the plate having a slot positioned therethrough defining a handle, wherein the slot is configured for insertion of digits of a hand of the user, enabling the user to grasp the handle;
    a tongue engaged to and extending from a lower edge of the plate, wherein the tongue is configured for insertion into a loop of a rope inserted through the hole, such that the rope is slidably engaged to the plate, the rope having a first end secured to an object, positioning a user for extending a second end of the rope through or around an anchoring element; and
    a protrusion engaged to and extending from a rear edge of the plate proximate to the lower edge, the protrusion being substantially L-shaped when viewed from a respective opposed side of the plate, such that the protrusion and the rear edge of the plate define a groove, wherein the groove is configured for insertion of the rope extending back from the anchoring element, positioning the user for knotting the rope such that the rope is engaged to the plate, wherein the plate is configured for sliding along the rope toward the object for tensioning the rope.

2. The rope tensioning device of claim 1, wherein the slot is positioned between the hole and an upper edge of the plate.

3. The rope tensioning device of claim 1, wherein the plate comprises aluminum.

4. The rope tensioning device of claim 1, wherein the tongue extends transversely from the lower edge toward the rear edge of the plate.

5. The rope tensioning device of claim 1, wherein the groove is arcuate proximate a lower limit thereof.

6. The rope tensioning device of claim 1, wherein the groove is tapered proximate to an upper limit thereof, such that the groove is dimensionally wider proximate to the upper limit relative to a midpoint thereof.

7. A rope and rope tensioning device combination comprising:
    a rope having a first end configured to be securable to an object;
    a plate having a hole positioned therethrough, the plate having a slot positioned therethrough defining a handle, wherein the slot is configured for insertion of digits of a hand of the user, enabling the user to grasp the handle;
    a tongue engaged to and extending from a lower edge of the plate, such that the tongue is positioned for insertion into a loop of the rope inserted through the hole, such that the rope is slidably engaged to the plate, positioning a user for extending a second end of the rope through or around an anchoring element; and
    a protrusion engaged to and extending from a rear edge of the plate proximate to the lower edge, the protrusion being substantially L-shaped when viewed from a respective opposed side of the plate, such that the protrusion and the rear edge of the plate define a groove, such that the groove is positioned for insertion of the rope extending back from the anchoring element, positioning the user for knotting the rope such that the rope is engaged to the plate, wherein the plate is configured for sliding along the rope toward the object for tensioning the rope.

8. A rope tensioning device comprising:
    a plate having a hole positioned therethrough, the plate having a slot positioned therethrough defining a handle, wherein the slot is configured for insertion of digits of a hand of a user, enabling the user to grasp the handle, the slot being positioned between the hole and an upper edge of the plate, the plate comprising aluminum;
    a tongue engaged to and extending from a lower edge of the plate, wherein the tongue is configured for insertion into a loop of a rope inserted through the hole, such that the rope is slidably engaged to the plate, the rope having a first end secured to an object, positioning the user for extending a second end of the rope through or around an anchoring element, the tongue extending transversely from the lower edge toward a rear edge of the plate, wherein the tongue is configured for frictionally engaging the rope for deterring slippage of the rope off of the tongue; and a protrusion engaged to and extending from the rear edge of the plate proximate to the lower edge, the protrusion being substantially L-shaped when viewed from a respective opposed side of the plate, such that the protrusion and the rear edge of the plate define a groove, wherein the groove is configured for insertion of the rope extending back from the anchoring element, positioning the user for knotting the rope such that the rope is engaged to the plate, wherein the plate is configured for sliding along the rope toward the object for tensioning the rope, the groove being arcuate proximate a lower limit thereof, the groove being tapered proximate to an upper limit thereof, such that the groove is dimensionally wider proximate to the upper limit relative to a midpoint thereof.

* * * * *